May 19, 1936.  C. E. PAINE  2,041,665
TRANSMISSION DEVICE
Original Filed Nov. 23, 1932  2 Sheets-Sheet 1
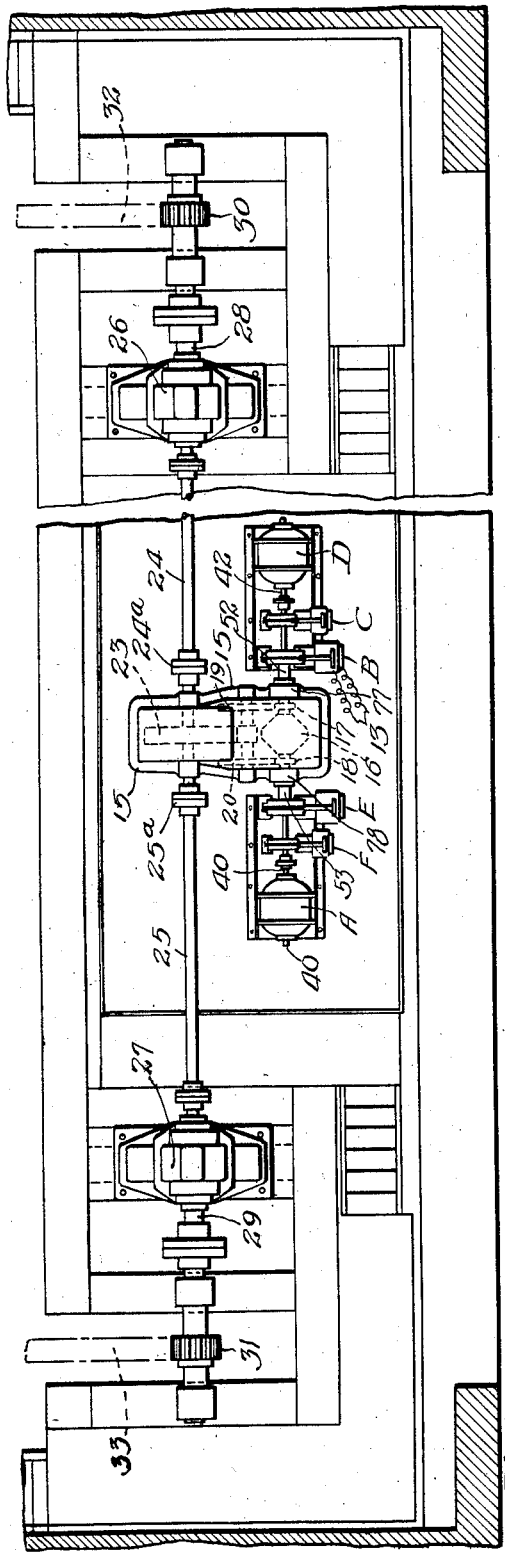
Inventor
Clifford E. Paine
By Luther Johns
atty.

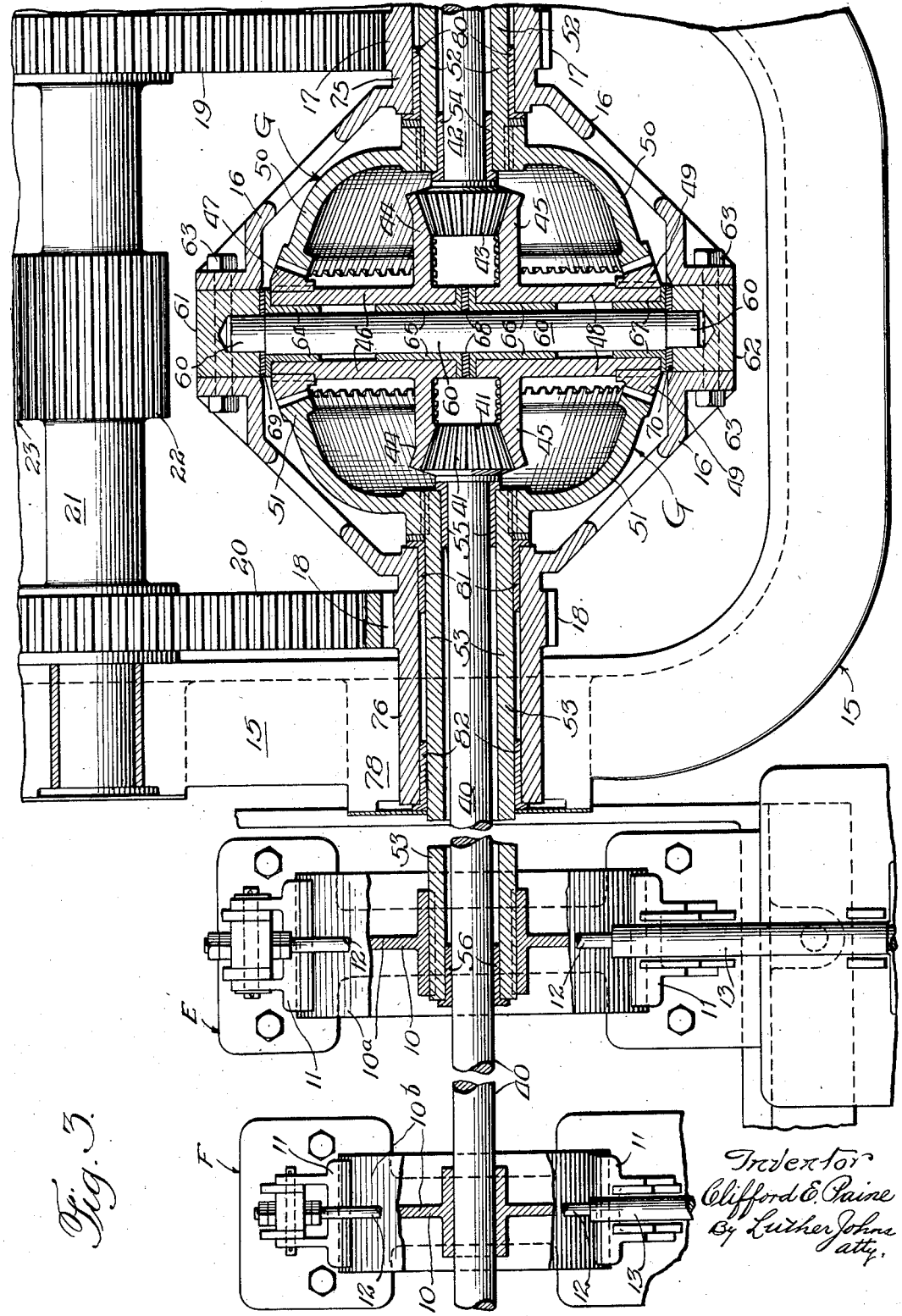

Patented May 19, 1936

2,041,665

UNITED STATES PATENT OFFICE 2,041,665

TRANSMISSION DEVICE

Clifford E. Paine, Chicago, Ill.

Application November 23, 1932, Serial No. 644,043
Renewed October 4, 1935

9 Claims. (Cl. 74—282)

In its broader aspects this invention relates to variable speed transmissions for rotary motion. In a more limited sense it relates to means for operating bascule or other lift bridges, in which connection the invention has peculiar importance. The operation of such bridges involves many difficult problems, owing to the great weight of the bridge span to be raised and lowered, the time limits within which the operation must take place to comply with traffic requirements, and the substantial certainty of action demanded at all times to avoid failures and delays.

The chief objects with respect to the bridge-operating mechanism, especially in the preferred embodiment of the device, are to render the operation more certain and dependable; to provide an unusually high factor of safety in the power plant without an excess of motors; to provide the advantages of high speed throughout most of the bridge travel, with slow starting and stopping speeds, and without the loss of driving torque at the ends of the bridge movements; to provide a system that may operate automatically to these advantages when put into action as by merely throwing a switch; to provide a system having a double-drive so co-ordinated as to utilize both for the main portions of the work, while providing for operation by one alone in an emergency, thus utilizing both of the motors for the greater part of the work and avoiding the idle condition of an emergency motor; to provide a system in which the size of the motors used is reduced to one-half that generally used; and to provide a power plant or operator that is small, compact, strong and durable, simple in construction and not likely to get out of order.

What may be termed the power plant of my novel bridge-operating system may be considered a variable-speed transmission, preferably reversing, and it is so shown herein. It is shown as including a planetary differential mechanism which may be driven by one motor but will preferably employ two motors for such chief advantages as arise, first, from having an emergency motor—in this instance one which may operate the device at the slower speeds should one motor become incapacitated; secondly, from providing the power of two motors for the high-speed operation. One object is to provide the various advantageous functions of a two-motor transmission as herein indicated. Another object is to provide a transmission having structural advantages, whether used with a single-motor or double-motor drive. Another object is to provide a construction according to which the speeds may be changed readily and easily, and without undue strains upon the mechanism, which is a feature of importance in the bridge-operating device.

Various other objects and advantages with respect to the several aspects of these improvements will appear from the ensuing description of the simple and advantageous embodiment illustrated, and which I now deem to be the best mode of carrying the invention into effect.

In the drawings Figure 1 is a top plan view showing the several instrumentalities organized as a complete power-transmitting mechanism for a bascule bridge;

Fig. 2 is a fragmentary side elevational view of the rear end of such bridge equipped with the mechanism of Fig. 1; and Fig. 3 is an enlarged fragmentary horizontal section through the planetary differential unit and two of the clutch mechanisms on their respective shafts.

Turning first to Fig. 1, there is a motor A and two friction-clutch devices or brakes B and C, also a motor D and two friction clutch devices or brakes E and F. The motors A and D are to be considered constant speed, reversible motors, alike in all material respects. They may also be considered to be respectively of but half the power normally required. For example, if for a bridge of a given size one hundred horse power is indicated, then the motors A and D will be of fifty-horse power each; and the additional 100-H. P. motor ordinarily installed for use, should the first become inoperative, is dispensed with. My two motors shown provide the desired safety feature in this respect, for if one becomes incapacitated, the other will operate the bridge, at a reduced speed.

The brakes B, C and E, F may be of any well-known or approved form, and the ones illustrated are units obtainable in the open market and call for no detailed description, although I will point out, referring to Fig. 3, that each comprises a brake-drum 10 and brake-shoes 11, and are of the solenoid-operated type in which there is a plunger or armature 12 movable in the solenoid winding 13. The four brakes or clutches illustrated are alike in all material respects, except that two sizes or capacities are shown. It will be understood that electric conductors, as those marked 13 in Fig. 1 and extending to brake B, connect each of the solenoids with a source of current whereby they may be operated electrically, either by closing a switch, by hand or automatically, according to the electrical system used, the brake shoes being normally maintained in contact with the brake drums respectively by springs or weights, and being drawn out of contact on the energization of the associated solenoid.

Between brakes or clutches B and E (Fig. 1) there is a housing marked as a whole 15. Turning to Fig. 3 there is a planetary differential device marked as a whole G having a rotary outer shell 16 carrying at one of its trunnion ends a pinion 17 and at its other trunnion end a pinion 18. These pinions 17 and 18 mesh with relatively large gears 19 and 20 respectively mounted on shaft 21 which is mounted for rotation in the housing 15 and carries positively the gears 19 and 20. Shaft 21 carries also the pinion 22 which meshes with gear 23 on a shaft in housing 15 (Fig. 1) connected by couplings 24a and 25a to shafts 24 and 25 respectively, these shafts being in driving relation to speed-reducers marked as a whole 26 and 27, and being of any well-known or approved type and construction. These speed-reducers 26 and 27 may be understood as containing pinions and gears effecting a reduction in speed of the aligned output shafts extending therefrom and marked 28 and 29 respectively and carrying the pinions 30 and 31 respectively. From Fig. 2 it will be noted that the output shaft as 28 extending from the speed-reducer as 26 is below shaft 24. From Fig. 2 taken with Fig. 1 it appears that pinions 30 and 31 are in mesh with arcuate racks 32 and 33 respectively carried by the bridge and being on the arc of the trunnions thereof as 34. The bridge has a counterweighted end portion 35 and a leaf portion 36 broken away in Fig. 2.

I have thus pointed out how rotation of the planetary differential shell 16 carrying the pinions 17 and 18 (Fig. 3) is communicated at a reduced rate to the pinions 30 and 31 and thence to the bridge. If the shell, frame or output rotor 16 be rotated in one direction the bridge will be swung upward on trunnions 34, and if rotated in the opposite direction the bridge will be swung downward.

There is nothing patentably novel in the details or arrangement thereof in that part of the power-transmitting mechanism extending from housing 15 and which includes the shafts 24, 25, speed-reducers 26, 27, output shafts therefrom 28, 29, pinions 30, 31, and the arcuate racks 32, 33. The distinctly novel subject matter hereof is the unit, mechanism or means shown illustratively in Fig. 3 and in the lower middle part of Fig. 1, together with the organization thereof with what is or may be old in a complete bridge-operating system. I may point out in this connection the advantages of supplying an operating unit which may be used for the special benefits afforded without changing the great bulk of the apparatus which may already be installed, or which good engineering has already sanctioned.

Turning to Fig. 3 it will be noted that shaft 40 extending from motor A carries a bevel pinion 41 within shell 16 and that shaft 42 extending from motor D has a bevel pinion 43, like pinion 42, similarly within shell 16. Pinions 41 and 43 mesh with a pair of transversely-arranged gears 44 on one side and 45 on the other. Gear 44 has an integral axial sleeve 46 on which is shown a bevel pinion 47, while bevel gear 45 has a similar sleeve 48 carrying bevel pinion 49. Pinions 47 and 49 mesh with cup-shaped bevel gears 50 and 51 respectively.

Gear 50 is rigidly secured to a sleeve 52 mounted to rotate on shaft 42, while gear 51 is rigidly secured to a sleeve 53 mounted to rotate on shaft 40. Instead of having these sleeves bear directly on the shafts within them I preferably provide bearing bushings at 54 and 55 and also at 56 so that these motor shafts will have replaceable bearing elements.

The opposed gears 44 and 45, their connected sleeves 46 and 48, and the pinions 47 and 49 on these sleeves are mounted for rotation as units on a shaft 60 having its ends held in blocks 61 and 62 secured in shell or rotor 16 by bolts 63, shaft 60 being thus carried positively by shell 16 at right angles to the axis of the motor shafts. Bearing bushings 64, 65, 66 and 67 provide bearing elements for the several members rotating on fixed shaft 60. A flat washer-like bushing 68 is between opposed gears 44 and 45, and there are similar spacing bushings 69 and 70 at the end bushings 64 and 67 respectively.

Shell 16 has a sleeve-like extension 75 on one side and 76 on the other side, and the pinions 17 and 18 are shown as being integral with these sleeves respectively; and these sleeves 75 and 76 have a bearing for rotation in housing 15 at 77 and 78 respectively (Fig. 1), and the previously-described sleeves 52 and 53 extend axially through sleeves 75 and 76 and have a bearing therein at the bushings 80, 81 and 82.

According to the construction thus far described rotor or shell 16 has trunnion bearings 77 and 78 in frame 15; co-axially within these trunnions are the sleeves 52 and 53 respectively carrying opposed gears 50 and 51 within shell 16; and co-axially within the sleeves 52 and 53 are the motor-driving shafts.

Rigidly secured upon sleeve 53 is the drum 10a of brake or clutch mechanism E (Fig. 3), while rigidly mounted upon driving shaft 40 is the drum 10b of brake or clutch mechanism F. It is to be understood that the drum of brake C (Fig. 1) is mounted on motor shaft 42 the same as brake mechanism F is mounted on shaft 40 in Fig. 3; and that the drum of brake mechanism B of Fig. 1 is secured rigidly to sleeve 52 (Fig. 3), the same as the drum of brake mechanism E is secured upon sleeve 53. In other words, and in general, what I have illustrated at the left-hand portion of Fig. 3 would be duplicated exactly if Fig. 3 were extended at the right-hand side. Furthermore, it is true that if we take the middle shaft 60 (Fig. 3) fixed in shell 16 as the middle of the device, the construction is exactly the same on each side of that middle line. The details illustrated in Fig. 3 are therefore sufficient to show the construction as a whole, and the operation of the mechanism can be described from the assembly of units in Fig. 1 taken with the details shown in Fig. 3.

I call one of the motors or prime-movers A and D the main driving motor and the other one the auxiliary driving motor. One of them will be the main and the other the auxiliary motor when the bridge is being raised and lowered; but the operator may select either A or D as the main motor. The main driving motor is used for starting, whether going up or coming down, and the starting is at slow speed, for example so as to provide a ratio of ten revolutions of the motor shaft to one for the rotating shell 16. The next speed, shown as two revolutions of the driving shaft to one of the shell 16 comes into operation soon after starting. The speed is then changed to a one-to-one ratio between the driving shaft and rotor 16, and at this time the second motor, called the auxiliary, comes into action. Thus the power of two motors is used for the high-speed operation, both on going up and on coming down. The system contemplates the use of one of the motors as A for the slower speeds going up and coming down, and the use of the other motor, as D, as a booster during the long high-speed movement of the bridge, when relatively great power is required.

With this understanding I shall now trace the operations more in detail.

Assume the constant-speed, reversible motor A to be energized. The shell 16 at first remains idle. If now, however, brake B (Fig. 1) be operated so as to hold sleeve 52 (Fig. 3) and consequently to hold cup-shaped gear 50 from turning, then the shell or rotor 16 is caused to turn through the action of bevel driving pinion 41, rotating gears 44 and 45, which turn pinions 47 and 49 and which creep on cup-shaped gear 50 and turn shell or rotor 16 at a relatively low speed determined by the ratios of the several gears involved. In the meantime cup-shaped gear 51 and the armature of motor D rotate idly. We will assume that the gear ratios are such as to turn the differential rotor 16 one revolution to ten revolutions of motor shaft 40 when brake B is operated to hold hollow shaft or sleeve 52 and cup-shaped gear 50.

In stepping up from the ten-to-one ratio to a two-to-one ratio the brake C (Fig. 1) is operated, and simultaneously with the tightening of brake C there is a release of brake B. This holds motor shaft 42 (of motor D) against rotation, and the action is such that driving pinion 41 (on motor A shaft 40) turns gears 44 and 45 as before, but now causing them to creep on the now-fixed pinion 43 (held by brake C) and which is of the same size in the embodiment illustrated as pinion 41, and carrying rotor 16 around once to each two revolutions of the driving shaft 40.

In going from the last-mentioned two-to-one ratio to a one-to-one ratio the driving current is applied to the now-auxiliary motor D, with the simultaneous release of brake B, and all of the brakes being thus now out of holding effect. Both motors now operate to turn their respective shafts in the same direction when viewed in the same direction. The result is that driving pinions 41 and 43 are in positive driving relation on opposite sides of gears 44 and 45, with the result that fixed shaft 60 communicates to shell or rotor 16 the full speed of motors A and D. While motor D is picking up speed there is a differential in the rotation of rotor 16 and its speed gradually increases until it attains the common speed of motors A and D. No injurious results can happen if one motor for any reason slows down since it merely provides a differential lessening of the speed of the rotor 16.

Assuming that the operations just described have carried the bridge to a place near its final raised position, the current is now cut off from motor D, and brake C (Fig. 1) is applied, which provides the same two-to-one ratio as before; and then brake B is applied, with the release of brake C, which gives the ten-to-one ratio as before.

These large bridges have considerable momentum and should only gradually reach their final positions, and this is provided for in a peculiarly advantageous way according to the present invention, and by the specific construction shown. This will be discussed more in detail hereinafter.

The next operation is to lower the bridge span. To this end we may again select either motor A or D as the main driving motor, but on the down movement the motors are reversed so as to drive shafts 40 and 41 in directions opposite to their directions on the upward movement.

I preferably would use the same motor as the main motor coming down as going up, but for purposes of this description let us assume the current to be switched into motor D as the main motor on the downward movement. Brake mechanism E is then operated to hold sleeve 53. Pinions 47 and 49 now creep on cup-shaped gear 51 and turn shell 16 once to ten revolutions of driving shaft 42. In a few seconds brake F may be operated to hold shaft 40, with the simultaneous release of brake E, and now gears 44 and 45 creep on pinion 41 and provide the two-to-one ratio on the downward movement. Motor A is now started and all brakes are released. This gives the one-to-one ratio going down. When the bridge is near the bottom of its movement the current is cut off from motor A and brake F is operated to hold shaft 40. This gives the two-to-one ratio. Then brake E is operated, with the release of brake F, to give the ten-to-one ratio. At this slow movement the bridge is seated, and locking mechanism (not shown, but old) is operated to hold it.

Ordinarily one motor as A will be used as the main driving motor for both the up and down movements, for say a week, and then motor D will be used as the main drive for say a week, thus distributing the work more equally between them.

Ordinarily bridge-operating mechanisms are provided with an emergency motor which stands idle most of the time and until the one in use breaks down, when the second motor comes into use until the first is restored. Such second motor must be of full capacity for operating the bridge. Each of the present motors A and D is of only half such capacity. If either should become incapacitated the bridge could still be operated, using the other at the two-to-one ratio throughout the greater part of the bridge travel.

In the older practice when the bridge is nearing the top or bottom of its movement the motor is slowed, as by a rheostat reducing the current supply, and when the bridge is about to stop the motor theoretically would be running at a very low rate. This would result, however, in such a loss of driving torque at the ends of the movement as seriously to impair the operation or cause its failure. The motor must be maintained at a sufficient speed to provide the necessary torque, but such speed is too great for a proper landing. It happens, therefore, that the momentum, which is never a constant, becomes a factor, and allowances are made for it, and a sort of guess-work condition is present in what is the most delicate part of the operation. According to these improvements the full torque of the motor is maintained to the very end and the bridge is seated very slowly but positively. The value of this will be apparent to all skilled in the art, but it may be mentioned that sometimes high wind velocities bearing on the raised span render the operation of the older devices exceedingly difficult and precarious.

The present unit may readily be installed in many existing bridge structures. It is simple in construction, and may be made according to mechanical practices well understood.

I have not shown the electrical circuits or system for operating the device, for, once it is pointed out what is to be done, and the sequence of the operations of the device illustrated, it is a matter of simple engineering to provide an appropriate electrical system employing means and devices well known. Ordinarily the electrical system will control the device automatically after a switch is thrown putting a motor in operation. This can be accomplished by a succession of make-and-break devices or contacts controlled by the movement of a part responsive to or coordinated with the movement of the bridge.

I contemplate as being included in these improvements all such variations, changes or departures from what is thus specifically illustrated and described as fall within the scope of the appended claims.

I claim:

1. A rotary speed transmission comprising in combination a rotary output member, at least two rotary input members, separate prime movers for driving the input members respectively, each of said input members and its respective prime-mover being relatively rotatable with respect to the output member, rotary power-transmitting devices operatively connecting the input members with the output members, means for restraining rotation selectively of the power-transmitting devices for driving the output member by either of the input members at one speed, means for restraining rotation of one of the input members for driving the output member at another speed while the speed of the driving member remains substantially constant, and means for selectively causing both of the input members to drive the output member at a third speed.

2. The transmission of claim 1 hereof in which said input members are on a common axis and are oppositely disposed and each thereof carries a pinion, and said output member includes a hollow frame mounted to rotate on said common axis and said pinions are within said frame, and there is gearing including two intermeshing relatively rotatable gears between each of said pinions and the output member.

3. In a transmission, the combination of two opposed co-axial input pinions, a rotary output member co-axial with said pinions, a rotary gear carried by the output member and meshing with both of said pinions, means for rotating both input pinions in the same direction, a pair of opposed gears rotatable on the axis of said input pinions, a pinion driven by said first-mentioned gear and in mesh with each of said opposed gears, means for selectively holding either of the input pinions against rotation, and means for selectively holding either gear of said pairs of gears against rotation.

4. The combination of two reversible motors, a differential mechanism adapted to operate in direct and reverse directions, said mechanism including two driving pinions rotatable by said motors respectively, a rotatable output member, and variable-speed gearing between the output member and both of said pinions, means for selecting certain of said gearing to drive the output member by either of said pinions in either direction of motor rotation, and means for selecting certain of said gearing to drive the output member by both of said pinions in either direction of motor rotation.

5. In a transmission, the combination of two opposed co-axial rotatable input pinions; a relatively rotatable output shell coaxial with said pinions and enclosing both; a transverse shaft carried within the shell between the input pinions; two rotatable gears carried by the shaft and each in mesh with both input pinions and each having a bevel pinion fixed thereon; a pair of rotatable cup-shaped gears coaxial with the input pinions and each receiving one of the input pinions therein; the said bevel pinions being in mesh with both of said cup-shaped gears, means for restraining rotation of one of the input pinions; and separate means for restraining rotation of one of the cup-shaped gears.

6. In a transmission, the combination of two opposed coaxial rotatable input pinions; a relatively rotatable output shell coaxial with said pinions and enclosing both; a transverse shaft carried within the shell between the input pinions; a rotatable gear carried by the shaft in mesh with both input pinions and having a bevel pinion fixed thereon; a pair of rotatable cup-shaped gears coaxial with the input pinions and each receiving one of the input pinions therein, the said bevel pinion being in mesh with both of said cup-shaped gears; means for restraining rotation of one of the input pinions; and separate means for restraining rotation of one of the cup-shaped gears.

7. In a variable speed device, the combination of a differential mechanism having a rotary output member and at least two rotary input members, a rotary prime-mover for each of said input members, means including a plurality of intermeshing relatively rotatable gears between each input member and the output member and in operative connection with both the input and output member, said gears being relatively rotatable with respect to each other and with respect to the rotary input member, and means for restraining rotation of one of said gears for selectively driving the output member at various speeds by either of said input members while maintaining the driving prime-mover at a substantially constant speed.

8. In a variable speed device, the combination of a differential mechanism having a rotary output member and at least two similar pinions, one of which is a driving pinion, a rotary prime-mover for the driving pinion, and means including a plurality of intermeshing relatively rotatable gears between each pinion and the output member and in operative connection with both the input member and the output member, said gears being relatively rotatable with respect to the pinion, and means for restraining rotation of one of said gears.

9. In a variable speed device, the combination of a differential mechanism having a rotary output member, at least two rotary input members, means including a plurality of intermeshing relatively rotatable gears between each input member and the output member and in operative connection with both the input and output member, said gears being relatively rotatable with respect to each other and with respect to the input members, and means for selectively restraining rotation of one of said gears and one of said input members.

CLIFFORD E. PAINE.